Patented May 10, 1927.

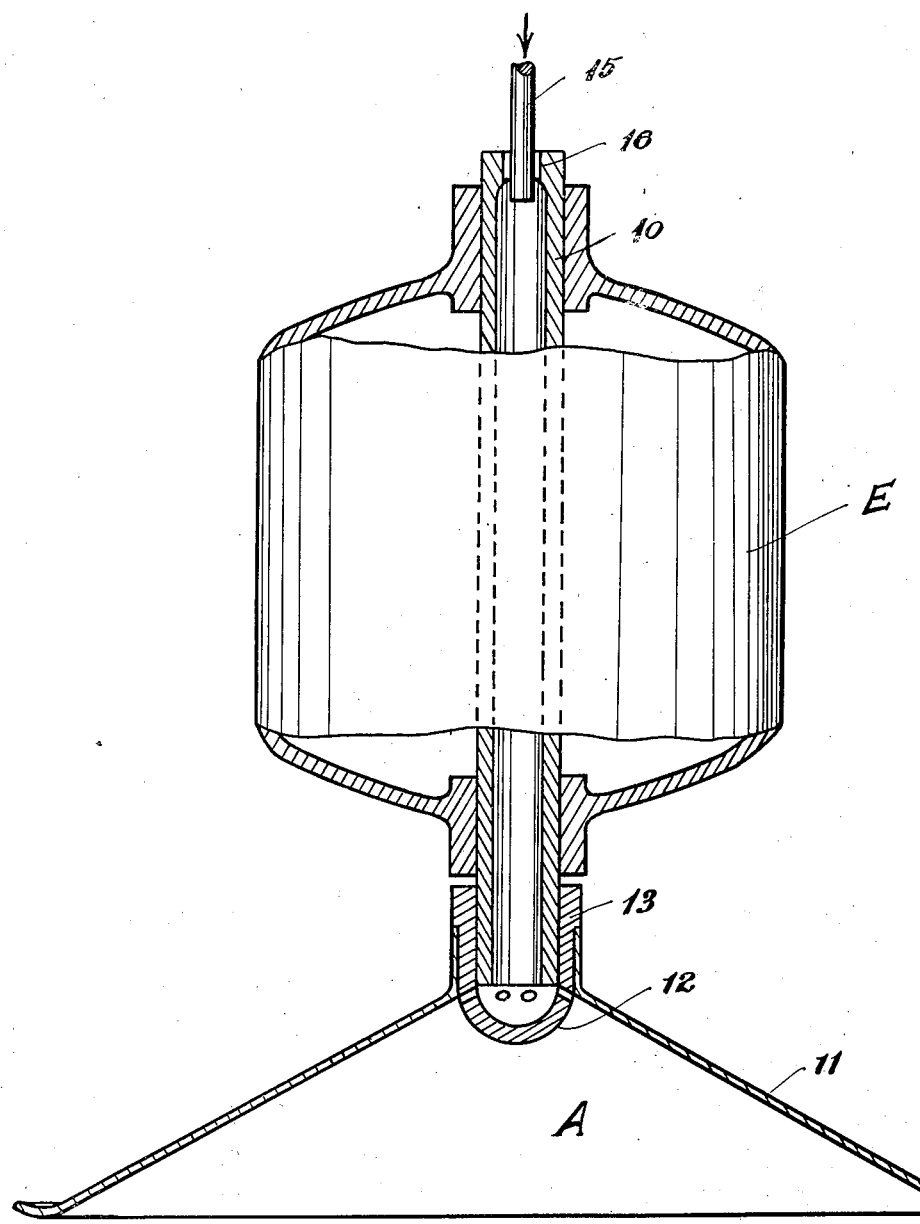

1,627,686

UNITED STATES PATENT OFFICE.

RAGNAR CARLSTEDT, OF STOCKHOLM, SWEDEN, ASSIGNOR TO MIDWEST AIR FILTERS, INCORPORATED, A CORPORATION OF NEW YORK.

HUMIDIFIER.

Application filed July 2, 1924. Serial No. 723,850.

My invention relates to humidifiers and consists in certain constructions and arrangements as fully set forth herein and shown in the accompanying drawings.

One object of my invention is to provide a humidifier which will supply a highly subdivided, fine mist.

Another object of my invention is to provide a humidifier of the rotating type which is supplied with humidifying liquid in such a way that an even distribution of the liquid on the rotating humidifier is effected.

Other objects and advantages of the invention will be apparent as the description proceeds, taken in connection with the accompanying drawings, in which:—

The figure shows one form of humidifier according to my invention.

Various more or less complicated arrangements have been used for this purpose, but I have found that results can be obtained by the simple device of my invention which satisfies all requirements and dissipates moisture in a finely subdivided mist which is much like a fog and thoroughly saturates the atmosphere with moisture without producing large drops which are heavy enough to fall.

In Fig. 1, E designates an electric motor for driving the humidifier. The rotating shaft 10 of the electric motor is hollow and constitutes a cylindrical member in which, during operation, a relatively thin cylindrical layer of water is disposed on the inside surface due to centrifugal force. On one end of the shaft 10 is the liquid dispensing cone 11 which rotates at high speed with the shaft. The inside of the cone, indicated at A is in communication with the central longitudinal passageway of the hollow shaft 10 by means of apertures 12 in a small cup-shaped attaching member 13 which connects hollow shaft 10 and cone 11.

Cone 11 is rounded at its outer periphery as indicated at 14.

The restriction 16 in the form of an annular shoulder on the inside of hollow shaft 10 at the end opposite to cone 11 serves to retain the liquid layer in the hollow shaft. A pipe 15 serves to supply liquid to the humidifier. This pipe 15 passes loosely through restriction 16. By making shaft 10 of larger diameter than is necessary for the conducting of the requisite amount of liquid through the same and so arranging the parts that centrifugal action holds the humidifying liquid in a layer on the inside of shaft 10, which layer is of less depth than the height of the shoulder 16, no stuffing box or other frictional union is necessary where pipe 15 enters the hollow shaft and yet the liquid can be led to the exact center of the inside of the cone and evenly distributed onto the cone.

It is to be noted that the liquid is led onto the cone in a ring form under the action of centrifugal force which is applied to it before it is led thereto. The liquid is not simply sprayed from a stationary pipe onto the cone. The thin layer of liquid entering onto the cone through apertures 12 is gradually made thinner and thinner as it moves outwardly under the action of centrifugal force until it is so thin that the particles of liquid lose their cohesive properties and the water is torn into fine atom like particles which are thrown off the rounded ends 14 of the cones into the atmosphere making a minutely subdivided mist. This is in part effected by the rounding of the periphery of the cone at 14 since as the liquid has a tendency to adhere to the metal, some of it will travel part way around the curve of the periphery before being thrown off and the liquid is thus subdivided both in outward direction and in direction perpendicular to the plane of the periphery of cone 11, that is, both radially and axially.

While I have described a specific embodiment of the invention, it will be readily seen that various parts may be changed and parts omitted and others added without departing from the spirit and scope of the invention.

What I claim is:

A humidifier comprising an electric motor, the shaft of said motor being hollow to provide a fluid passageway therethrough, and having a restriction at one end thereof, a fluid supply pipe extending into said hollow shaft through and beyond said restriction, the other end of the hollow shaft having a perforated cap secured thereto, and a funnel-shaped spreader secured at its smaller end to said cap, the perforations in the cap being positioned to direct the liquid from the hollow shaft along the surface of the spreader remote from the motor, said spreader having a reversely curved peripheral rim.

In testimony whereof I hereunto affix my signature.

RAGNAR CARLSTEDT.